United States Patent [19]

Moffitt, Jr.

[11] Patent Number: 4,507,004
[45] Date of Patent: Mar. 26, 1985

[54] SIDE HANDLE RESERVOIR BRUSH

[76] Inventor: Merritt L. Moffitt, Jr., 9 Weirwood Rd., Radnor, Pa. 19087

[21] Appl. No.: 440,864

[22] Filed: Nov. 12, 1982

[51] Int. Cl.³ .................... A46B 11/04; A47L 13/22
[52] U.S. Cl. .................................. 401/275; 401/138
[58] Field of Search ............... 132/112, 113, 114, 85; 401/13, 189, 270, 271, 274, 275, 187, 186, 138, 286, 287, 276, 176; 15/341, 345, 346, 24, 29; 417/566

[56]  References Cited
U.S. PATENT DOCUMENTS 2,743,042  4/1956  Burgin .............................. 401/186
3,537,124 11/1970  Wallin .............................. 15/341
4,094,031  6/1978  Cellini ............................. 15/341
4,372,700  2/1983  Moffitt, Jr. ....................... 401/138

Primary Examiner—Richard J. Apley
Assistant Examiner—Carolyn A. Harrison
Attorney, Agent, or Firm—John J. Simkanich

[57] ABSTRACT

A utility brush, usable in car or window washing, includes a hollow, cylindrical handle which communicates through a passageway to a brush head, and has been improved whereby a piston is manually operated within the cylinder, by a handle extending through the side wall of the cylinder, the movement of this handle along a slot in the cylinder defining the stroke of the piston; a collapsible diaphragm-type valve at the passageway connection end of the cylinder opens to allow a large flow of fluid on the piston vacuum stroke and is otherwise closed to divert fluid flow through small by-pass ports leading to the brush head passageway.

8 Claims, 4 Drawing Figures

SIDE HANDLE RESERVOIR BRUSH

BACKGROUND OF THE INVENTION

This invention relates to utility brushes, and especially to those types of utility brushes which include an internal reservoir for holding a supply of cleaning fluid. Particularly it relates to suction pump type utility brushes whereby the operation of the suction pump facilities the rapid filling of a fluid into the reservoir.

The cleaning of various objects, such as cars, building windows and other structures usually involves the use of a brush and a cleaning fluid, such as soapy water. Normally soapy water is held in a bucket and the cleaning brush is dipped into the bucket to take up the soapy water onto the bristles of the brush. This technique is time consuming and must be repetitively performed as the brush bristles retain only small amounts of the water necessitating the repeated dipping.

A reservoir brush has been taught by Wilson, U.S. Pat. No. 2,517,152. This brush incorporates a reservoir into the brush head structure itself, does not have a handle and does not have a piston.

Cellini, U.S. Pat. No. 4,094,031, and Whitehouse U.S. Pat. No. 946,832, each teach a brush having a hollow cylindrical handle with a piston operating therein. However, neither patent teaches or suggest the side extending piston operating handle or a valving operation which defines two port sizes, a large one for filling under vacuum and a smaller one for emptying at other times.

Brooks, U.S. Pat. No. 2,379,421, McCickor, U.S. Pat. No. 1,453,152, Bolsey U.S. Pat. No. 2,737,329, Boral, U.S. Pat. No. 2,391,385, Hjorth U.S. Pat. No. 1,634,618, Kingman et al. U.S. Pat. No. 1,953,940 and Stein German Pat. No. 279,982, all show self filling fountain pens having a barrel reservoir with a piston for drawing in ink. However, these fountain pens show nothing which has not already been shown by Cellini who has incorporated a piston in the handle of his brush which is connected to his brush head.

Pickering U.S. Pat. No. 3,261,367, shows a cartridge loaded pressure feed toothbrush which includes a plunger in the hollow handle of a toothbrush. The plunger of Pickering is not designed to come in contact with or to draw in toothpaste or any fluid or solution, but is merely designed to compress a prefilled cartridge. No valving is shown or suggested.

A pending patent application on a utility brush, Ser. No. 252,761, filed Apr. 10, 1981, to which a notice of allowance has been issued, shows a hollow handled brush wherein the handle acts as a reservoir for the soapy water. No piston or valving was considered or incorporated into this utility brush. A suction pump reservoir brush is shown in another pending patent application, Ser. No. 276,847, filed June 24, 1981. Allowable subject matter has been indicated. This brush, which has been offered for sale by Moffitt Products, Inc. of Radnor, Pa., includes a hollow cylindrical handle connected to a brush head having a passageway from the bristle side of the brush to the hollow cylindrical handle. A metering screw is adjustable to define the passageway opening side. While this screw is adjustable, it was not intended to be moved or adjusted between vacuum and priming strokes of the piston nor during the operation of the brush where the fluid within the hollow handle is permitted to discharge through the passageway to the bristle portion of the brush head. This suction pump reservoir brush does include a piston mounted within the cylindrical chamber forming the handle of the brush. However, this piston has a handle which operates in a manner similar to that shown in Cellini and the various fountain pen patents; as it extends outwardly from the end of the cylindrical handle. No valve is shown or suggested which would automatically allow a large flow into the cylindrical handle then limit a small flow out of the handle.

The sum teachings of the prior art, including the two pending applications of brush designs, while developing a fluid reservoir brush technology which is a vast improvement over the simple push broom or handled brush bucket-dipping operation does not provide a design which is uncumbersome to operate and which will quickly fill while slowly emptying. This prior technology has relied upon a residual vacuum in the reservoir to cause a slower discharge of the fluid than filling. Often a small vent hole has been used to allow small amounts of air to enter the reservoir chamber thereby attempting to meter the discharge flow rate. However, controlled discharge rates have always been a problem. As a piston wears, the residual vacuum is not as effective. Moreover, a small vent hole control scheme does not preclude air from entering the reservoir through the discharge passageway in the brush head (bubbling fashion).

An object of the present invention is to provide a piston operated reservoir brush where the piston operating handle does not increase the length of the brush handle.

A second object of the invention is to provide a piston operated reservoir brush where the piston handle stroke is convenient for the normal arm movement of someone grasping the brush cylinder handle.

A further object of the invention is to provide such a reservoir brush with an automatically operated metering valve which allows a large volume of fluid to enter the reservoir through the brush head but small volumes to exit the reservoir.

An even further object is to provide this brush with an auxiliary flow controller for adjusting the volumetric flow rate.

SUMMARY OF THE INVENTION

The objects of this invention are realized in a combination reservoir scrub brush having a hollow handle attached to the brush head, this handle being a cylinder for containing a supply of fluid, which is permitted to enter from and discharge to the bristle area of the brush through a passageway in the head of the brush, which connects to the reservoir portion of the handle to the bristles. It is the handle itself which forms the cylindrical reservoir. A piston operates longitudinally within the cylinder to create a vacuum on a retracting stroke and a pressure on a return stroke. This pressure can be used to aid discharge.

The piston is operated manually by a handle which extends through the side of the cylindrical reservoir and operates in a longitudinal slot in the side of the reservoir. The length of this slot as well as the length of a connecting rod between the piston handle and the piston itself determines the length of the permitted stroke and the inactive position of the piston. The side operating piston handle provides a fixed length brush handle.

A cylindrical metering structure incorporates a check valve and is positioned at the outlet of the reservoir where it intercepts the passageway leading to the bristles. This metering structure includes a flexible diaphragm-type check valve which opens to allow a large volume of fluid to enter the reservoir during a vacuum stroke of the piston but is otherwise closed. A plurality of small ports provide a by-pass around the check valve and allow a lesser volume of fluid to discharge from the reservoir. An adjustable baffle is incorporated to restrict these discharge port by-pass opening to variably meter the discharge rate of the fluid.

DESCRIPTION OF THE DRAWINGS

The features, advantages and operation of the invention will be better understood from a reading of the following detailed description of the invention in conjunction with the accompanying drawings in which like numerals refer to like elements and in which.

DETAILED DESCRIPTION OF THE INVENTION

Figure 1:
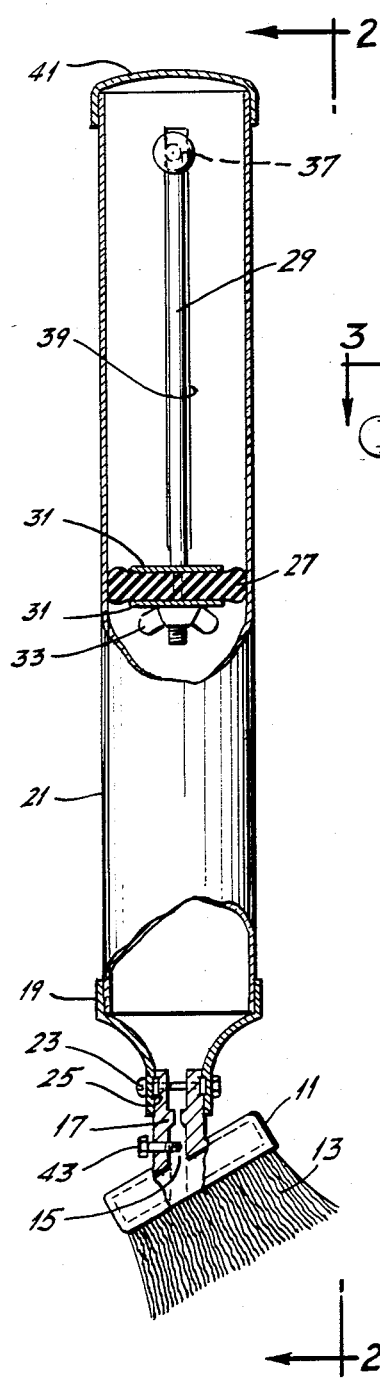
FIG. 1 shows a longitudinal cross-sectional view of the side handled reservoir brush invention.

The side handle pump reservoir brush of the invention as shown in FIG. 1. This invention includes a replaceable brush head 11 having a plurality of bristles 13 extending from side thereof. This brush head 11 can be constructed of a number of materials, including wood and plastic, and the bristles 13 can likewise be made of any of a plurality of materials including nylon, plastic and natural fibers. The brush head 11 can take on any of a number of shapes, and as shown in FIG. 1, is relatively flat and rectangularly shaped.

A passageway 15 extends through the head 11 from the bristle 13 side to the opposite side. This passageway can be a single bore or a plurality of bores as may be chosen by the manufacturer. Passageway 15 leads to a collar 17 which extends away from the brush head 11 and about the passageway 15 opening. In the embodiment shown in FIG. 1 the collar 17 is circular and is canted at an acute angle with the brush head 11. This collar 17 extends a short distance to form a short cylindrical mounting surface.

A cylindrical reducer pipe 19 connects the smaller diameter cylindrical collar 17 to a larger diameter hollow cylindrical handle 21, this handle 21 being hollow to form a cylindrical reservoir. The reducer pipe 19 may be glued or otherwise attached to the collar 17 in such a manner as to preclude leakage about the joint. It is a simple matter to bolt the cylindrical reducer pipe 19 to the collar 17 using a bolt 23 and a gasket 25. The gasket 25 can be an annular type with diametrically opposed holes for passing the bolt 23. Gasket 25 seals against seepage around the outside of the collar 17 and about the bolt 23. This gasket 25 can vary in shape but need only be flat.

The cylindrical reservoir 21 is a cylindrical tube which extends a distance sufficient to provide a length of handle for the brush head 11 and to hold a desired quantity of water as well as a piston structure.

A soft rubber donut-shaped structure 27 forms the head of a piston 27 which operates within the cylindrical reservoir 21. This head 27 is held onto a first end of a straight rod 29, and threaded at both ends, by a pair of flat washers 31 and a nut 33.

The rod 29 extends longitudinally along the center line of the cylindrical reservoir 21 and has a guide block 35 mounted on its end opposite piston head 27. A pump handle and grip 37 is attached to the side of the guide block 35 and extends outwardly through the side of the cylindrical reservoir 21 at a 90° angle to the longitudinal axis of this reservoir 21. This handle 37 operates within a slot 39 which extends partly down the length of the reservoir 21 from the end opposite the brush head 11. A removeable cap 41 closes off that end of the cylindrical reservoir 21.

The length of the operating rod 29 and the slot 39 determine both the stroke of the piston head 27 and the initial and final positions of the piston head 27.

Figure 2:
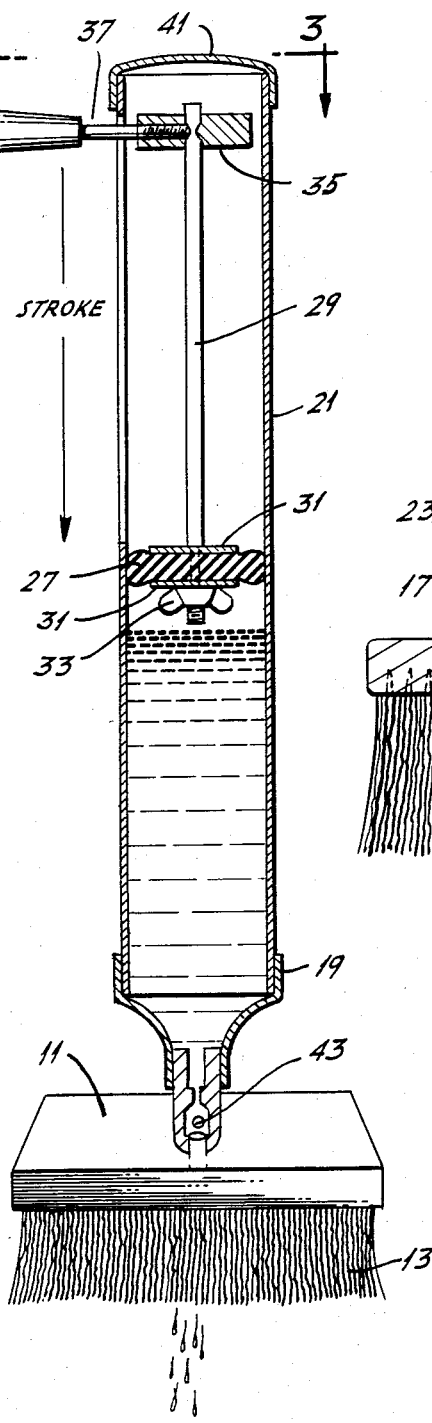
FIG. 2 shows a cross-sectional view taken from another angle as indicated in FIG. 1.
Figure 3:
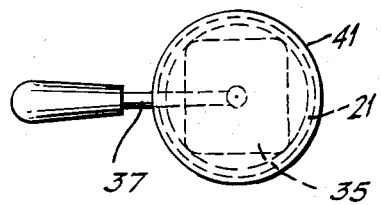
FIG. 3 shows a cross-sectional top view of the cap end of the piston as indicated in FIG. 2.

The guide block 35 as shown in FIGS. 2 and 3 can be rectangular whereby it minimizes contact with the inside walls of the cylindrical reservoir 21 and minimizes friction while maintaining a stable support for the rod 29. Rod 29 thereby remains parallel to the longitudinal axis of the cylindrical reservoir 21 throughout the operation of the pump.

As with all pumps, an absolute seal cannot always be maintained between the piston head 27 and the inside walls of the cylindrical reservoir 21. Therefore, in order to provide a controlled flow from the cylindrical reservoir 21 an auxiliary metering screw 43 can be inserted to restrict the crossectional opening of the passageway 15. One disadvantage of such a metering pin 43 is that it restricts the opening of the passageway 15 for both filling and discharging functions necessitating the pumping operation carried out by the piston head 27 to be continued over a longer period of time in order to fill the cylindrical reservoir 21 to the desired volume.

Figure 4:
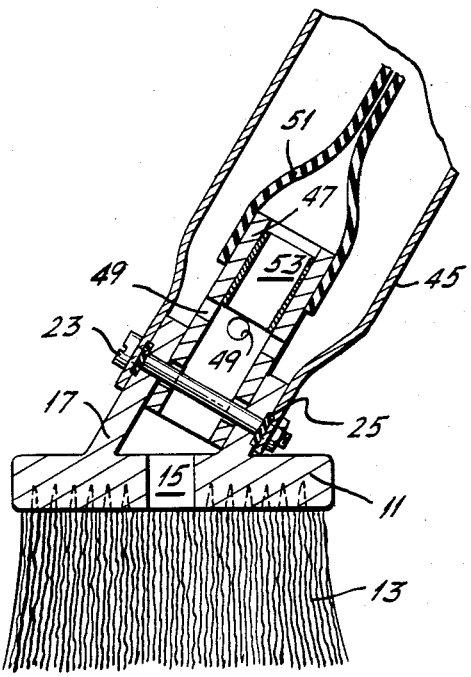
FIG. 4 shows a cross-sectional view, at the brush head end of the brush, which shows an alternate emobidument for the coupling of the cylindrical reservoir to the brush head and a detail of the variable metering check valve structure.

FIG. 4 shows a second embodiment of the subject invention where the metering pin 43 is absent and a variable rate check valve structure is inserted. This embodiment, FIG. 4, utilizes the same brush head 11, bristles 13, passageway 15, and cylindrical collar 17 as the first embodiment of FIGS. 1 and 2. However, the end of the cylindrical reservoir 45 is molded down to a smaller diameter so that the molded reservoir 45 meets the collar 17 directly.

The anchoring bolt 23 is used to secure the molded reservoir 45 to the collar 17 using the gasket 25.

A short length of pipe being the cylindrical insert 47 is secured to the inside of the cylindrical collar 17 by the same bolt 23. This cylinder insert 47 contains a plurality of discharge ports 49 which pass through the side walls of the cylinder insert 47.

Connected to the cylinder reservoir 45 end of the cylinder insert 47 is a flexible, and collapsible flat rubber diaphragm-like check valve 51. This check valve 51 opens on the vacuum stroke of the piston head 27 and closes on the pressure stroke or under the pressure of a head of fluid held in the reservoir 45.

When the piston 27 is operated to draw in water, water enters at a larger volumetric rate through the passageway 15 than through the collar 17, then through the cylindric insert 47 and then through the check valve 51 which is open. Otherwise, water passes out of the molded reservoir 45 through the discharge ports 49 and into the collar 17 and passageway 15. As the discharge ports 49 combine total opening area is less than the opening area afforded by the cylindrical insert 47 and opened check valve 51 the reservoir 45 discharges at a much slower rate than it fills.

To further adjust the discharge rate, a metering sleeve 53 which is cylindrical in nature operates within the cylindrical, insert 47 in a friction fit. This sleeve 53 can manually be adjusted on partial disassembly of the apparatus to slide over the opening of the discharge ports 49.

The structure of the invention provides a pump operated reservoir brush which fills upon operation of the pump handle 37, the pump handle 37 extending out of the side of the brush handle 21 which forms the reservoir, This allows for a compact structure for the brush handle 21 and eliminates an overextension of the pump rod 29 which in the prior art was brought out of the end of the reservoir 21 creating an awkward operating structure. In addition, a metering check valve 51 permits the fast filling of the reservoir 21 and the inhibited or slow discharge of the reservoir 21 once filled.

Many changes can be made in the above-described invention without departing from the intent and scope thereof. Therefore, it is intended that all matter contained in the above description and shown in the accompanying drawings be interpreted as illustrative and not be taken in the limiting sense.

What is claimed is:

1. A suction pump brush having a brush head with bristles on one side thereof, an elongate reservoir hollow handle capable of holding a fluid attached to another side of said brush head, a passageway passing through said brush head and connecting said hollow handle to said bristle side of said brush head, and a piston positioned within said hollow handle and operable to create a vacuum at said passageway, the improvement comprising:

mechanical means for operating said piston in reciprocating movement, said mechanical means being connected to said piston and extending outwardly through a longitudinal side of said hollow handle;

check valve means positioned to intercept the fluid passing through said passageway, said check valve means operating to open upon said piston created vacuum and closed otherwise thereby preventing fluid from reentering said passaeway therethrough;

at least one discharge port providing a by-pass around said check valve means.

2. The brush of claim 1 also including means associated with said discharge port for adjusting said port opening size.

3. The brush of claim 1 including a plurality of discharge ports adjacent said check valve means, and providing a by-pass therearound, and means associated with said discharge port for adjusting simultaneously each said port opening size.

4. The brush of claim 3 wherein said mechanical means includes:

a rod holding said piston at its first end;

a guide attached to said rod other end, and positioning said rod parallel to the longitudinal axis of said hollow handle; and a pump handle connected to said guide, said handle extending perpendicular to said cylindrical handle side wall and having a grip thereon.

5. The brush of claim 4 wherein said guide is rectangularly shaped and said cylindrical handle has a longitudinally extending slot therein through which said pump handle extends.

6. The brush of claim 5 wherein said brush head includes a cylindrical collar extending from about said passageway opening, said cylindrical hollow handle being mounted on said collar.

7. The brush of claim 6 wherein said check valve means includes:

a cylindrical insert within said collar and extending into said cylindrical hollow handle, and a flexible flat tube having a split opening at one end and attached to the cylindrical insert on the opposite end, wherein said discharge ports provide openings through the wall of said cylindrical insert below said tube attachment.

8. The brush of claim 7 wherein said discharge ports adjusting means includes a metering sleeve positioned within said cylindrical insert and movable to slide over said discharge port openings.

* * * * *